Nov. 12, 1929.  W. MILLER  1,735,125
BALL OR ROLLER CLUTCH
Filed Feb. 3, 1927    3 Sheets-Sheet 2
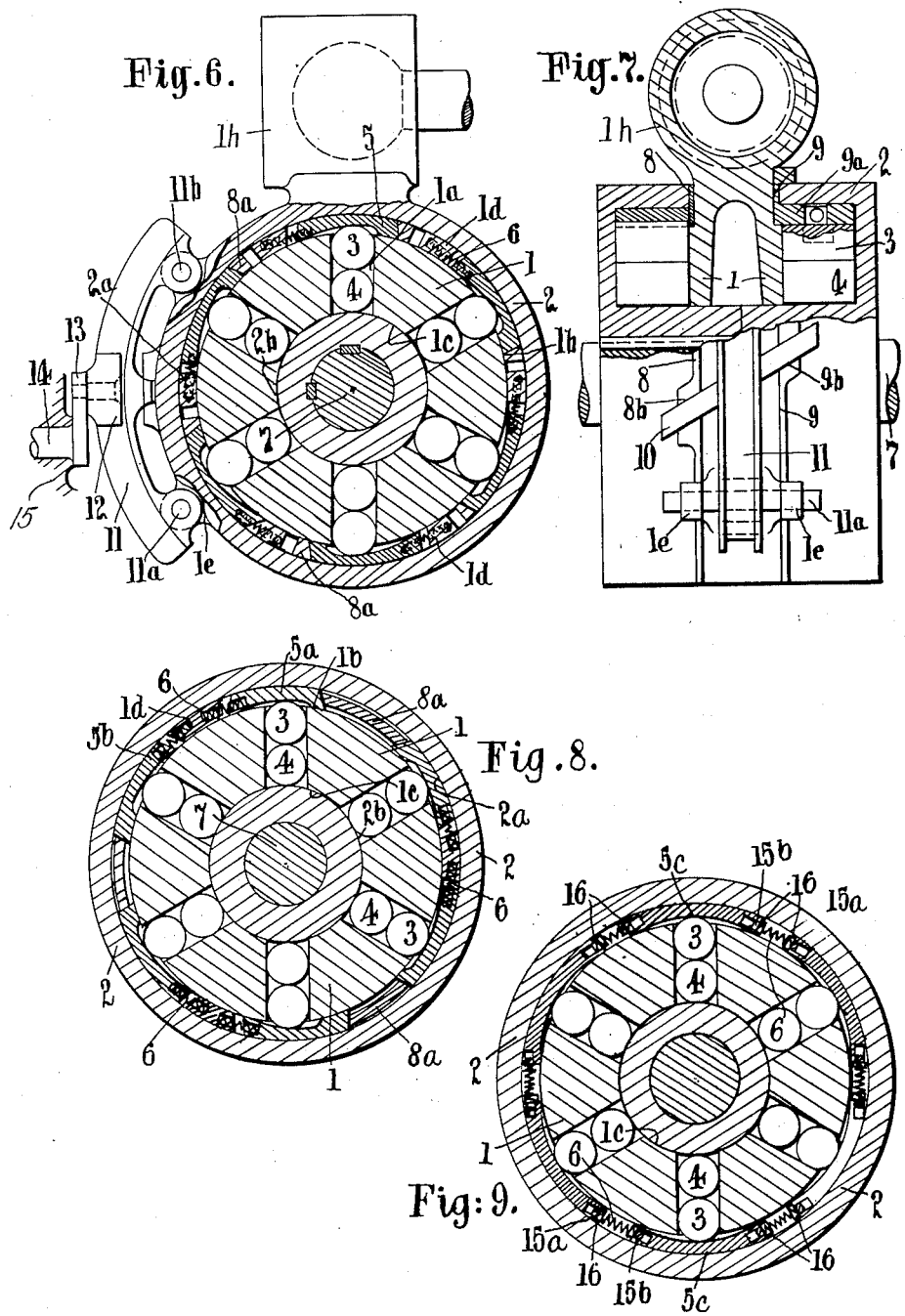
Inventor:
William Miller.
by his Attorney.

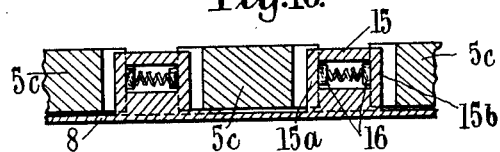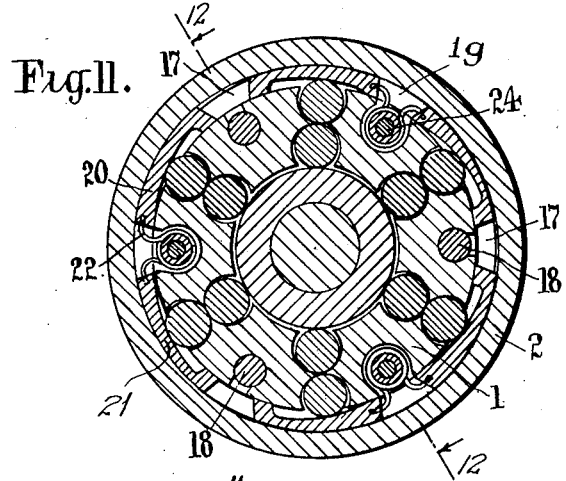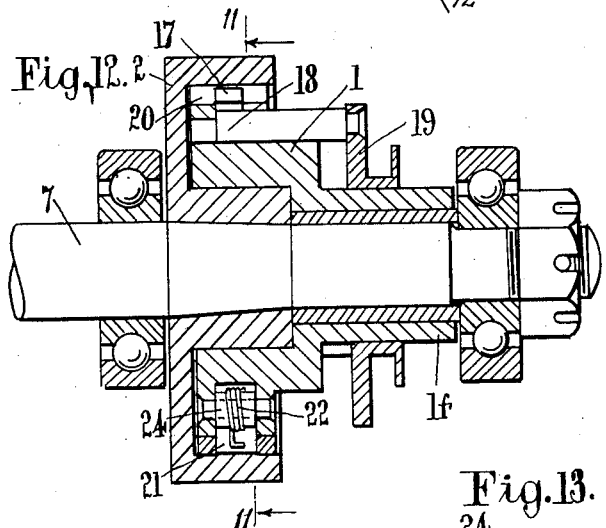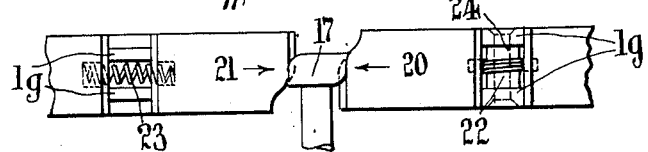

Patented Nov. 12, 1929

1,735,125

UNITED STATES PATENT OFFICE

WILLIAM MILLER, OF DUNSTON-ON-TYNE, ENGLAND

BALL OR ROLLER CLUTCH

Application filed February 3, 1927, Serial No. 165,668, and in Great Britain February 17, 1926.

The invention relates to ball or roller clutches and has for its object to provide a clutch mechanism of this kind in which the action is instantaneous, and play between the parts is eliminated. A further object of the invention is to provide means whereby wear of the working faces is automatically taken up.

According to the invention one of the clutch members (hereinafter referred to as the "roller carrying member") has associated therewith one or more ball or roller units each comprising an even number of balls or rollers (hereinafter referred to as "rollers") arranged in a line substantially transverse of the direction of movement of the clutch members, the said rollers cooperating with a cam or wedge surface so that when one of the clutch members is moved a virtual toggle action occurs between the rollers and clutch members and an effective engagement occurs.

Preferably the working faces of the clutch members are parallel, and the cam or wedge surface is in the form of a separate wedge member movable with its respective roller unit, but at the same time capable of a small movement relatively to the latter, the said wedge member being preferably spring pressed against its adjacent roller in order to obviate play between the members.

The invention will now be described with reference to the accompanying drawings, in which Figs. 1 to 5 are fragmentary semi-diagrammatic views showing the principle of the clutch in various forms.

Fig. 6 is a sectional elevation of a form of clutch according to the present invention adapted for use in connection with a variable speed gear of the kind set forth in the specification of our copending patent application Serial No. 165,667.

Fig. 7 is an end view partly in section of Fig. 6.

Fig. 8 is a sectional elevation of a form of clutch according to the present invention capable of forward and reverse movement.

Fig. 9 is a sectional elevation of an alternative form of reversing clutch according to the present invention.

Fig. 10 is a development showing the arrangement of the wedges and control ring of the clutch shown in Fig. 9.

Fig. 11 is a sectional elevation of a modified form of the clutch shown in Fig. 8 taken on the line 11—11 of Fig. 12.

Fig. 12 is a longitudinal sectional view taken on the line 12—12 of Fig. 11, and Fig. 13 is a development showing the means for moving the wedges of the arrangement shown in Figs. 11 and 12 to their forward and reverse positions.

Referring more particularly to Fig. 1 of the drawings which shows the principle of the clutch in its simplest form, the numeral 1 indicates the roller carrying member, and 2 the other clutch member which is of channel section, the member 1 being slidable in the channel. The member 1 has a transverse slot formed at $1^a$, in which two rollers 3, 4 are positioned, the sum of the diameters of the rollers being greater than the length of the slots $1^a$ so that they may contact with the surfaces $2^a$, $2^b$ of the member 2. The surface $2^a$ is inclined to provide the wedge action; the face $1^b$ is also inclined to correspond with $2^a$, but it may be left parallel with the under face $1^c$.

The action of the clutch is as follows:—
Assume the rollers 3, 4 to be just in contact with the surfaces $2^a$, $2^b$. If the points of contacts $y$, $x$, $y^1$ be joined as shown, it will be seen that the rollers comprise a virtual toggle joint with the point of contact $x$ between the rollers as the middle of the toggle. Assume pressure is applied to the member 1 in the direction of the arrow: the rollers will tend to turn in the direction indicated, which motion is equivalent to their tending to turn about the points $y$, $y^1$ which are also their instantaneous centres of rotation on the faces $2^a$, $2^b$. A toggle action thus results, and a pressure is exerted between the rollers and the faces $2^a$, $2^b$, the pressure increasing with the pressure exerted on the member 1, so that an effectual clutching action results. As in an ordinary toggle joint there is no jamming or wedging action in the true sense of the word, so it is in the present device, and the mere ceasing to exert pressure on the member 1 immediately releases the clutch.

The form of clutch shown in Fig. 1 is the simplest, and is of necessity of limited application, the members always coacting at substantially the same position. To allow of the clutching action occurring at any point, the arrangement shown in Fig. 2 is employed.

According to the arrangement shown in Fig. 2, the wedge surface comprises a separate wedge member 5, while the face $2^a$ is parallel with the face $2^b$, and the face $1^b$ with the face $1^c$, with the said wedge member 5 slidable between the faces $2^a$ and $1^b$. The inclined face $5^a$ of the wedge 5 is maintained in contact with the roller 3 by means of a spring 6 inserted between an abutment $1^d$ on the member 1 and the wide end of the wedge 5. As will be seen, the toggle action of the rollers is the same as in the arrangement shown in Fig. 1, but as the wedge 5 moves with the member 1, the clutch action may take place at any relative position of the members 1 and 2, while with the wedge always maintained in contact with the roller 3, the wear is automatically taken up, so that it is impossible for play to develop. The clutch is therefore instantaneous in its action, and in actual practice has proved to be responsive to the slightest oscillatory movement.

Fig. 3 shows an arrangement for a revoluble clutch. The corresponding parts have the same reference numerals as in Fig. 2, as the only difference is that they are circular instead of straight. The driven member 2 is shown keyed to a shaft 7. The action is exactly the same as described with reference to Fig. 2.

Fig. 4 shows another construction in which the slots $1^a$ are slightly offset, the effect of which is to make the toggle action more effective as will be seen from the altered relative disposition of the toggle $y$, $x$, $y^1$ relatively to the centre line of the clutch.

Fig. 5 shows the same form of clutch as shown in Fig. 3, but in place of a plain transverse slot for the rollers, two intersecting holes are bored with their axes parallel with the axis of the shaft 7 and lying in a substantially radial plane. The object of this construction is to provide a larger wearing surface between the rollers 3, 4 and the member 1. In order to allow of the free rolling of the rollers, there must be an easy fit between the walls of the intersecting holes and the rollers. The toggle action being instantaneous, this construction does not interfere with it at all, but in any case the easy fit between the rollers and walls of the intersecting holes is sufficient to ensure operation.

It will be seen that the action of the clutch depends on the rollers rolling in the right direction, hence an even number of rollers is necessary, but the number may be varied to suit conditions. Normally with revoluble cutches there will be a plurality of sets of rollers and wedges as hereinafter set forth.

Figs. 6 and 7 show a clutch according to the present invention adapted for use with a variable speed gear of the kind described in our copending patent application Serial No. 165,667. According to this construction two complete clutches of the kind shown in Fig. 3 are used, but the driving members are rigidly connected to a common socket member $1^h$ jointed to one of the connecting rods of the said gear. The wedges 5 of the one clutch are oppositely disposed to the wedges of the other clutch, so that one clutch is for forward and the other for reverse drive, the arrangement being such that when one clutch is operative the other is inoperative.

To render one or other of the clutches operative or inoperative, a pair of annular discs 8, 9 are inserted between the driving and driven members 1, 2, and on these are formed a series of abutments $8^a$, $9^a$, one for each wedge the said abutments abutting against the narrow ends of the wedges, so that by moving a ring the wedges are forced back against their springs until the cam surfaces are out of contact with the rollers. The control rings are so disposed that when the one is in the no-drive position the other is in the driving position. A diagonal groove is formed in each of the control rings 8, 9, at $8^b$, $9^b$ respectively with which a diagonal cam member 10 engages. The said cam member 10 is rigid with a grooved segmental member 11 mounted on pins $11^a$, $11^b$, to a slide in eyes formed in lugs $1^e$ on the driving member 1. A slipper 12 pivotally mounted on a lever arm 13, engages in the groove of the segment 11. The arm 13 is mounted on or is integral with a shaft 14 supported in the casing 15 of the gear mechanism (not shown) the said shaft being connected by suitable linkage mechanism to a lever adjacent the operator's position.

It will be seen that movement of the reversing lever will cause the arm 13, slipper 12 and with them the cam 10 to move transversely of the clutch so that the control rings 8, 9 are moved angularly relatively to the clutch driving member 1. By this means the wedges 5 of one of the clutches are moved into operative position and those of the other clutch into inoperative position. In the mid-position of this control mechanism the wedges of both clutches are inoperative.

Fig. 8 shows a single clutch mechanism capable of operation in two directions. The wedges $5^a$, $5^b$ are single acting and oppositely disposed, these are arranged in alternate disposition around the driving member 1, the ends of a pair of wedges near the "neutral" portion of the cam surface abutting against an abutment $8^a$ on a single reversing or control ring, while the other ends abut against an abutment $1^d$ on the driving member through the intermediary of a spring 6. Movement of the reversing ring in one direction will then bring one half of the wedges to positions with their cam faces in contact with the rollers, and the other half with their cam faces clear of the rollers. Movement of the control ring in the opposite direction reverses these positions.

Figs. 9 and 10 show an arrangement wherein the cams are double acting so that all the sets of rollers are in use for either direction of drive. In this form the neutral portions of the cam surfaces of the wedges $5^c$ are in the middle, the said surfaces sloping symmetrically on either side of the mid-portion towards the axis of the clutch mechanism. The ends of the wedges are slotted to receive abutments 15 on the reversing ring, each of said abutments being slotted as shown to receive a spring 6 the ends of which fit into cups 16 which abut against the ends $15^a$, $15^b$ (Fig. 10) of the slot and against the ends of adjacent wedges. In this form, movement of the reversing ring 8 to one position has the effect of compressing each of the springs 6 between one of the ends of a wedge $5^c$ and one of the abutments $15^a$, $15^b$, so that the wedges tend to move in the one direction when free, while movement of the said ring to the other position compresses the springs between the other ends of the wedges and the other of the abutments $15^a$, $15^b$, so that the wedges tend to move in the opposite direction when free. Thus the single clutch mechanism is rendered reversible without rendering any of the members inoperative.

In both the constructions above set forth the actuating mechanism for effecting the reversal of the clutch is as described above with reference to Figs. 6 and 7, with the difference that instead of there being two reversing rings there is only the one to be actuated by the said mechanism.

Figs. 11 to 13 show an arrangement for rendering more positive the control of the clutch shown in Fig. 8. In this construction the control rings are dispensed with and instead there are provided cam members 17 rigidly secured to pins 18 which project from a bridle collar 19 mounted on a sleeve $1^f$ integral with the driving member 1. The said cam member 17 is interposed between two oppositely operative wedges 20, 21 which are spring pressed by means of springs 22 or 23 against the cam member 17. The ends of the wedges which contact with the cam 17 are shaped so that during the movement of the cam 17 in one direction from its mean position one of the said wedges is unaffected and remains stationary, and the other wedge is moved towards the cam 17 by its respective spring, while during movement in the opposite direction the reverse action occurs.

The springs may either be in the form of coil springs 22 each of which is wound around a pin 24, and having its ends pressing against the adjacent ends of two wedges; or they may be in the form of helical springs 23 each of which is inserted in recesses in the ends of two adjacent wedges.

In clutches having double acting wedges the slots for the rollers require to be radial. When pairs of oppositely disposed wedges are used half the slots may be offset in one direction and half in the other direction as shown in Fig. 11.

I claim:

1. A clutch comprising two members, an even number of circumferentially contacting rolling elements arranged in one of said members substantially transverse of the direction of movement of the clutch members, a pair of flanges on the other clutch member said flanges embracing the outer of said rolling elements, and camming means on one of the clutch members, said camming means being independent of said rolling elements, with which camming means the said rolling elements are adapted to cooperate so that when one of the clutch members is moved the clutch is engaged.

2. A clutch comprising two members, an even number of circumferentially contacting rolling elements comprising a plurality of units each containing an even number of said elements arranged in one of said members substantially transverse of the direction of movement of the clutch members, a pair of flanges on the other clutch member said flanges embracing the outer of said rolling elements, and camming means on one of the clutch members, said camming means being independent of said rolling elements, with which camming means the said rolling elements are adapted to cooperate so that when one of the clutch members is moved the clutch is engaged.

3. A clutch comprising two members, an even number of circumferentially contacting rolling elements arranged in one of said members substantially transverse of the direction of movement of the clutch members, a pair of flanges on the other clutch member said flanges embracing the outer of said rolling elements, and separate camming means movable with the said rolling elements, said camming means being independent of said rolling elements, with which camming means the said rolling elements are adapted to cooperate so that when one of the clutch members is moved the clutch is engaged.

4. A clutch comprising two members, an even number of circumferentially contacting rolling elements comprising a plurality of units each containing an even number of said elements arranged in one of said members substantially transverse of the direction of movement of the clutch members, the other clutch member embracing the outer of said rolling elements, and a plurality of wedges movable with the said rolling elements, with each of which wedges one of said rolling element units is adapted to cooperate so that when one of the clutch members is moved the clutch is engaged.

5. A clutch comprising a member of channel section, a roller carrying member movable in said channel member, an even number of circumferentially contacting rolling elements comprising a plurality of units each containing an even number of said elements arranged in said roller carrying member substantially transverse of the direction of movement of the clutch members, so that the said rolling elements are disposed between the sides of the channel member, and camming means on one of the said members, said camming means being independent of said rolling elements, with which camming means the said rolling element units are adapted to cooperate so that when one of the said members is moved the clutch is engaged.

6. A clutch comprising a member of channel section, a roller carrying member movable in said channel member, an even number of circumferentially contacting rolling elements arranged in said roller carrying member substantially transverse of the direction of movement of the clutch members so that the said rolling elements are disposed between the sides of the channel member, said camming means being independent of said rolling elements, and camming means on one of the said members with which camming means the said rolling elements are adapted to cooperate so that when one of the said members is moved the clutch is engaged.

7. A clutch comprising a member of channel section, a roller carrying member movable in said channel member, an even number of circumferentially contacting rolling elements arranged in said roller carrying member substantially transverse of the direction of movement of the clutch members so that the said rolling elements are disposed between the sides of the channel member, and separate camming means movable with but independent of the said rolling elements on one of the said members, with which camming means the said rolling elements are adapted to cooperate so that when one of the said members is moved the clutch is engaged.

8. A clutch comprising a member of channel section, a roller carrying member movable in said channel member, an even number of circumferentially contacting rolling elements comprising a plurality of units each containing an even number of said elements arranged in one of said members substantially transverse of the direction of movement of the clutch members, so that the said rolling elements are disposed between the sides of the channel member, and a plurality of wedges movable with the said rolling elements, with each of which wedges one of said rolling element units is adapted to cooperate so that when one of the clutch members is moved the clutch is engaged.

9. A clutch comprising two members, an even number of circumferentially contacting rolling elements arranged in one of said members substantially transverse of the direction of movement of the clutch members, the other clutch member embracing the outer of said rolling elements, separate camming means movable with the said rolling elements, with which camming means the said rolling elements are adapted to cooperate so that when one of the clutch members is moved the clutch is engaged, and means for rendering said camming means inoperative.

10. A clutch comprising two members, an even number of circumferentially contacting rolling elements comprising a plurality of units each containing an even number of said elements arranged in one of said members substantially transverse of the direction of movement of the clutch members, the other clutch member embracing the outer of said rolling elements, a plurality of wedges movable with the said rolling elements, with each of which wedges one of said rolling element units is adapted to cooperate so that when one of the clutch members is moved the clutch is engaged, and means for rendering said wedges inoperative.

11. A clutch comprising a member of channel section, a roller carrying member movable in said channel member, an even number of circumferentially contacting rolling elements arranged in said roller carrying member substantially transverse of the direction of movement of the clutch members so that the said rolling elements are disposed between the sides of the channel member, separate camming means movable with the said rolling elements on one of the said members, with which camming means the said rolling elements are adapted to cooperate so that when one of the said members is moved the clutch is engaged, and means for rendering said camming means inoperative.

12. A clutch comprising a member of channel section, a roller carrying member movable in said channel member, an even number of circumferentially contacting rolling elements comprising a plurality of units each containing an even number of said elements arranged in one of said members substantially transverse of the direction of movement of the clutch members, so that the said rolling elements are disposed between the sides of the channel member, a plurality of wedges movable with the said rolling elements, with each of which wedges one of said rolling element units is adapted to cooperate so that when one of the clutch members is moved the clutch is engaged, and means for rendering said wedges inoperative.

13. A clutch comprising a disc having two concentric flanges thereon, an annulus disposed between said flanges and having a plurality of substantially radial cavities therein, a plurality of rolling element units each of which comprises an even number of circumferentially contacting rolling elements located in said cavities, a plurality of spring pressed wedges adapted to slide between one of the disc flanges and the annulus, each of which wedges has its inclined face adapted to abut against a rolling element of one of said rolling element units.

14. A clutch comprising a disc having two concentric flanges thereon, an annulus disposed between said flanges and having a plurality of substantially radial cavities therein, a plurality of rolling element units each of which comprises an even number of circumferentially contacting rolling elements located in said cavities, a plurality of wedges adapted to slide between one of the disc flanges and the annulus, each of which wedges has its inclined face adapted to abut against a rolling element of one of said rolling element units, an abutment on the annulus adjacent the wide end of each wedge, and a spring interposed between each of said abutments and its adjacent wedge.

15. A clutch according to claim 13 having means for withdrawing said wedges out of contact with their respective rolling element units.

16. A clutch according to claim 13 having a control ring normally movable with the wedges, abutments on said control ring each adapted to abut against the end of a wedge at its narrow portion, and means for imparting movement to the said ring to move the wedges to bring their narrow portions opposite their rolling elements.

17. A clutch comprising a disc having two concentric flanges thereon, an annulus disposed between said flanges and having a plurality of substantially radial cavities therein, a plurality of rolling element units each of which comprises an even number of circumferentially contacting rolling elements located in said cavities, a plurality of pairs of oppositely disposed wedges adapted to slide between one of the disc flanges and the annulus, each of which wedges has its inclined face adapted to abut against a rolling element of one of said rolling element units, an abutment on the annulus adjacent the wide end of each wedge and a spring between each of said abutments and its adjacent wedge, and means for withdrawing said wedges out of contact with their respective rolling element units.

18. A clutch comprising two members one of which has formed therein an even number of intersecting cylindrical bores having their axes parallel with the working faces of and transverse of the direction of movement of the clutch members, an even number of circumferentially contacting rolling elements each of which is positioned in one of said bores, the other clutch member embracing the outer of said rolling elements, and camming means on one of the clutch members with which camming means the said rolling elements are adapted to cooperate so that when one of the clutch members is moved the clutch is engaged.

19. A clutch according to claim 18, including means for withdrawing said wedges out of contact with their respective rolling element units.

In witness whereof I have signed this specification.

WILLIAM MILLER.